United States Patent [15] 3,692,877
Shibahara et al. [45] Sept. 19, 1972

[54] EMULSIFIABLE OXIDIZED POLYOLEFINS

[72] Inventors: Yasuo Shibahara, Kyoto; Yasohachi Shimoyama, Kawasaki; Makoto Otaki, Kyoto, all of Japan

[73] Assignee: Sanyo Chemical Industries, Ltd., Kyoto, Japan

[22] Filed: June 22, 1970

[21] Appl. No.: 48,469

[30] Foreign Application Priority Data

Dec. 25, 1969 Japan ........................45/252

[52] U.S. Cl. ...260/897 B, 260/29.6 XA, 260/88.2 S, 260/93.7, 260/94.9 GC
[51] Int. Cl. .........C08f 29/12, C08f 3/04, C08f 27/22
[58] Field of Search ...260/29.6 XA, 94.9 GC, 897 B, 260/93.7

[56] References Cited

UNITED STATES PATENTS

| | | |
|---|---|---|
| 2,879,238 | 3/1959 | De Groote et al. ........260/28.5 |
| 2,952,649 | 9/1960 | McCall et al. ............260/28.5 |
| 3,160,621 | 12/1964 | Hagemeyer et al. ......260/94.9 |
| 3,247,141 | 4/1966 | Stryker et al. .............260/23 |
| 3,434,993 | 3/1969 | Mirabile et al. ..........260/29.6 |

Primary Examiner—Joseph L. Schofer
Assistant Examiner—William F. Hamrock
Attorney—Oblon, Fisher & Spivak

[57] ABSTRACT

An emulsifiable polyolefin having a combination of improved emulsifiability and thermal stability is produced by oxidizing a thermally decomposed polyolefin with a gaseous mixture containing oxygen and ozone in the presence of a low molecular weight oxidized polyolefin.

12 Claims, No Drawings

EMULSIFIABLE OXIDIZED POLYOLEFINS

BACKGROUND OF THE INVENTION

1. Field Of The Invention

This invention relates to a process for producing oxidized polyolefins. It relates more particularly to a process for producing oxidized polyolefins having both greatly improved emulsifiability and thermal stability from low molecular weight polyolefins which have been obtained from thermal degradation of high molecular weight polyolefins.

2. Description Of Prior Art

There are various well-known processes for the production of emulsifiable polyolefins by oxidizing high or low molecular weight polyolefins with oxygen, a gas containing oxygen, or a mixture of oxygen and ozone. One conventional process which has been carried out commercially involves oxidizing a low molecular weight polyolefin obtained by thermally degrading a polyolefin having a high molecular weight with oxygen or a gas containing oxygen. This conventional process and the product produced thereby, however, has some disadvantages resulting from the many double bonds present in the thermally degraded polyolefin starting material.

In oxidation with oxygen or a gas containing only oxygen as the active oxidant, the resulting product has poor thermal stability due to the double bonds present in the molecule. For example, even if the product is heated at a low temperature (e.g., 150° C.) for only a short time, it will suffer both a change in color and an increase in melt viscosity which results in a lowering of the emulsifiability. In addition, the oxidation process using only oxygen as the active oxidant has the further disadvantage that the double bonds are subject to cross-linking polymerization with each other during the oxidation process. Such cross-linking polymerization may be prevented by carrying out the oxidation at low temperatures (e.g., 120°–130° C.), but this inherently slows the rate of the oxidation reaction.

We have found that most of the above disadvantages are overcome by a process which uses a mixture of oxygen and ozone as oxidants. In this oxidation reaction, the thermally decomposed polyolefin may be easily oxidized at the double bonds under mild reaction conditions such as low temperatures and atmospheric pressure. Therefore, this process is commercially practicable and attractive, and furthermore provides a product which has few double bonds and good thermal stability. We have also found, however, that the product obtained by this process is poorer in emulsifiability than the product obtained by careful oxidation with only oxygen-containing gas in the absence of ozone. Without wishing to be bound by any particular theory or explanation of this phenomenon, this may be because the oxidation with a mixed oxidant takes place mainly at the double bonds and little takes place at other parts of the molecules such as methylene groups.

All in all, oxidation of a thermally degraded polyolefin with only oxygen-containing gas gives poor thermal stability to the product, while oxidation with a mixture of oxygen and ozone gives poor emulsifiability to the product, though the product has good thermal stability.

SUMMARY OF THE INVENTION

It is, therefore, an object of this invention to provide a commercially practicable process for producing oxidized polyolefins of low molecular weight having both improved emulsifiability and improved thermal stability. This and other objects will become apparent from the following description.

These and other objects are attained by the process of the present invention which comprises producing an emulsifiable polyolefin by oxidizing a low molecular weight polyolefin, obtained by thermally degrading a polyolefin having a high molecular weight, with a gas containing both oxygen and ozone, in the presence of an oxidized polyolefin having a low molecular weight.

DETAILED DESCRIPTION OF PREFERRED EMBODIMENTS

The low molecular weight polyolefin used in this invention has a molecular weight of 500–10,000 (preferably between 1,000 and 5,000) and is produced by conventional thermal degradation of a polyolefin having a high molecular weight (for example, 10,000 to 500,000), such as polyethylenes produced by any of the conventional processes (e.g., the high pressure polymerization process, Ziegler process, Phillips process, Standard Oil Process, etc.), polypropylenes (isotactic, atactic, etc.), and copolymers of ethylene with a small amount (less than 30 percent by weight of the total) of at least one other alpha olefin such as propylene, butene-1, pentene-1, hexene-1, and heptene-1. Of course, mixtures of two or more suitable polyolefins may also be oxidized in accordance with the process of this invention. Polyethylene is the preferred low molecular weight polyolefin. The low molecular weight polyolefin is generally substantially unoxidized, but a polyolefin having a slight degree of oxidation may also be used, The methods of manufacturing the thermally degraded polyolefins which may be used in this invention are described in detail in the literature, e.g., U.S. Pat. Nos. 2,928,797, 2,828,296, 2,835,659, and British Pat. No. 1,108,295.

The low molecular weight oxidized polyolefins used in this invention are such oxidized polyolefins as oxidized polyethylenes, oxidized polypropylenes and oxidized copolymers of ethylene with a small amount at least one other alpha olefin (such as propylene, butene-1, pentene-1, hexene-1, and heptene-1) having a molecular weight of 500 to 10,000 (preferably 1,000 to 5,000) and an acid number of 3 to 100 (preferably 10 to 50). As long as the requirements of molecular weight and acid number are met, it is not critical what process has been used to prepare the low molecular weight oxidized polyolefin. Thus, the low molecular weight oxidized polyolefins may be produced by oxidizing the above-mentioned low molecular weight polyolefins or a low molecular weight polyolefin obtained by the telomerization of at least one olefin monomer. The low molecular weight oxidized polyolefins may also be produced by thermally degrading a high molecular weight polyolefin in the presence of an oxidant. These various methods are described in detail in the literature, e.g., U.S. Pat. Nos. 2,874,137, 2,928,797, and 3,060,163. Preferably used are those oxidized polyolefins having substantially no cross-linkages in the molecules which may, for example, be obtained by oxidizing thermally degraded polyolefins with a gas containing both oxygen and ozone. For practical purpose, the product or intermediate obtained by the process of this invention is used as the oxidized low molecular weight polyolefin component in the subsequent oxidation process.

The ratio of the oxidized low molecular weight polyolefin component to the low molecular weight polyolefin to be oxidized may vary within a wide range depending upon such factors as the acid number of the oxidized low molecular weight polyolefin and the characteristics desired in the product to be obtained. However, the acid number of the mixture must be at least 2 in order to attain the objects of this invention, and is generally between 2 and 50.

A gas containing oxygen and ozone is used as the oxidizing agent in this invention. Common examples of such a gas are oxygen containing ozone and air containing ozone. The latter is preferred for reasons of safety in operation. The concentration of ozone may vary within a wide range, but it is generally present in an amount of from 0.3 to 1 percent by volume of the total volume of the gas. In carrying out the process of this invention, the starting materials are first charged to a reaction vessel and heated to a reaction temperature. The gas then is brought into contact with the hot, melted materials at the desired rate of flow, with vigorous stirring. When the desired degree of oxidation has been attained, introduction of the gas is stopped, and the resulting oxidized polyolefin is discharged from the vessel. The process can also be carried out continuously, in which case the low molecular weight polyolefin to be oxidized is continuously charged to the reaction vessel and mixed with the oxidized low molecular weight polyolefin present in the vessel in such a proportion that the acid number of mixture is at least 2. The reaction temperature may be higher than the melting point of the low molecular weight polyolefin (e.g., 100° C.), but should not exceed 150° C. The flow rate of the gas may vary within a wide range, but is preferably in the range of 1 to 5 liters per minute per kilogram. The oxidation reaction is usually carried out under any suitable means of agitation, such as by stirring. In general, the more intensive the stirring is, the better are the results obtained, because the mixture of the two raw materials is thereby kept more homogeneous and brought into closer contact with the oxidant gas. The oxidation reaction is usually carried out under atmospheric pressure. If desired, however, it may be carried out under elevated or reduced pressure.

The desired degree of oxidation will vary depending on the properties desired in the final product. The oxidation would generally be continued at least until a product having acceptable emulsifiability has been obtained. In general, the degree of oxidation may be determined by the acid number of the product, which is usually in the range of 5 to 100, and preferably from 10 to 50.

One of the advantages of this invention is that the oxidation can be completed in shorter time than in the conventional processes because the reaction velocity is increased in the initial stages of the oxidation due to the increased solubility of oxidant. This is achieved in the reactant by the addition of a low molecular weight oxidized polyolefin component to the thermally degraded polyolefin which is to be oxidized. The product of this invention has remarkably improved emulsifiability and thermal stability.

The product obtained by this invention which generally has a molecular weight of about 500–10,000 (preferably 1,000–5,000) and an acid number of 5–100 (preferably 10 to 50) is suitable for various utilities well known in the art, such as a component in textile finishes, and paper treating agents in aqueous emulsions, and base materials of polishing waxes.

The following Examples are presented as illustrative of this invention, and it will be understood that the invention is not limited thereto.

EXAMPLE 1

700 g. of polyethylene having an average molecular weight of about 2,000 was prepared by thermally degrading at 380° C. a high molecular weight polyethylene having a melt index of about 2 which was obtained by the high pressure polymerization method. 300 g. of an oxidized low molecular weight polyethylene having an acid number of 15 was prepared by oxidizing the above polyethylene with air containing 0.5 percent by volume of ozone at 120° C. The components were charged into a reaction vessel equipped with a stirrer, gas inlet, gas outlet, and thermometer, and melted at 120° C. under stirring. The acid number of the mixture was 4.5. The oxidation was then carried out by bubbling air containing 0.5 percent by volume of ozone into the melted reaction mixture at a rate of 2.5 liters per minute at 120° C. under stirring for 7 hours.

The resulting waxy product had an acid number of 15, a Gardner color of less than 1, and a melt viscosity of 180 cps. at 140° C. The product was maintained at 150° C. for 5 hours to test its thermal stability. The result of this test are shown in Table 1. The emulsifiability is given in Table 2 below.

EXAMPLE 2

850 g. of polyethylene having an average molecular weight of about 2,000 was prepared by thermally degrading at 380° C. a high molecular weight polyethylene having a melt index of about 2 which had been prepared by the high pressure polymerization method. This was mixed with 150 grams of an oxidized low molecular weight polyethylene having an acid number of 30 (which was obtained by oxidizing the above polyethylene with air containing 0.5 percent by volume of ozone at 130° C.) at 120° C. under stirring. The acid number of the mixture was 4.5. The mixture was then oxidized as described in Example 1. The resulting waxy product had an acid number of 15, a Gardner color of less than 1, and a melt viscosity of 190 cps. at 140° C. The emulsifiability is shown in Table 2 below.

EXAMPLE 3

700 g. of a polyethylene having an average molecular weight of about 2,000 was prepared by thermally degrading at 395° C. a high molecular weight polyethylene having a melt index of about 5 which had been prepared by the low pressure polymerization method. This was mixed at 130° C. under stirring with 300 g. of an oxidized low molecular weight polyethylene having an acid number of 18 which had been prepared by oxidizing the above low molecular weight polyethylene with air containing 0.5 percent by volume of ozone at 130° C. The acid number of the mixture was 5.4. The mixture was then oxidized as described in Example 1. The resulting waxy product had an acid number of 18, a Gardner color of less than 1, and a melt viscosity of 185 cps. at 140° C. The emulsifiability is given in Table 2 below.

TABLE 1

|  | Product of Example 1 | Product (A) oxidized with air |
|---|---|---|
| color change | <1 →2 (Gardner color) | <1 →5 |
| viscosity change | 180 → 190 (cps. at 140°C.) | 190 → 300 |

Note: Product (A) was obtained by oxidizing the same low molecular weight polyethylene as in Example 1 with air at 120°C. under 5 kg./cm.² for 10 hours.

EXAMPLE 4

700 g. of polyethylene having an average molecular weight of about 3,500 was prepared by thermally degrading at 375° C. a high molecular weight polyethylene having a melt index of about 7 which had been produced by the high pressure polymerization method. This was mixed with 300 g. of oxidized low molecular weight polyethylene having an acid number of 20, which had been prepared by oxidizing the above polyethylene with air containing 0.5 percent volume of ozone at 120° C. according to the present invention. The reactants were charged into the same reaction vessel as in Example 1, and melted at 120° C. The acid number of the mixture was 6. Air containing 0.5 percent by volume of ozone was then bubbled into the melted reaction mixture at a rate of 2.5 liters per minute at 120° C. under stirring for 9 hours.

The resulting waxy product had an acid number of 20, a Gardner color of less than 1, and a melt viscosity of 300 cps. at 140° C. The emulsifiability is given in Table 2 below.

EXAMPLE 5

For a continuous process, a 5 liter reaction vessel equipped with agitator, thermometer, gas inlet, gas outlet, inlet for continuous introduction of starting materials, and outlet for continuous discharge of a product was used.

2800 g. of oxidized low molecular weight polyethylene having an acid number of 15 was prepared as in Example 1. This was charged into the reaction vessel and heated at 120° C. under agitation. A polyethylene having a molecular weight of about 2,000 which was obtained by thermally degrading a high molecular weight polyethylene with a melt index of about 2 was then continuously fed into the reaction vessel at a rate of 350 g. per hour under vigorous agitation. Air containing 0.5 percent by volume of ozone was continuously blown into the vessel at a rate of 10 liters per minute to oxidize the melted mixture. The temperature was maintained at about 120° C. during the oxidation. The product was continuously discharged out of the vessel after an average retention time of about 8 hours.

The resulting waxy product has an acid number of 15, a Gardner color of less than 1, and a melt viscosity of 180 cps. at 140° C. The emulsifiability is given in Table 2 below.

COMPARATIVE EXAMPLES

Examples 1 through 4 were repeated without adding the oxidized low molecular weight polyethylene. The resulting oxidized low molecular weight polyethylene products were similar to those obtained in Examples 1 through 4 with respect to acid numbers, Gardner colors, and melt viscosity. However, the products obtained in these comparative Examples were far inferior to those which were obtained when the oxidized low molecular weight polyolefin component was added to the reaction mixture in accordance with this invention. The emulsifiability of the comparative example products is shown in Table 3.

TABLE 2 – EMULSIFIABILITY (This Invention)

| Product | example 1 | example 2 | example 3 | example 4 | example 5 |
|---|---|---|---|---|---|
| Acid Number | 15 | 15 | 18 | 20 | 15 |
| Gardner Color | <1 | <1 | <1 | <1 | <1 |
| Melt Viscosity at 140°C. (cps.) | 180 | 190 | 185 | 300 | 180 |
| Emulsion | example 1 | example 2 | example 3 | example 4 | example 5 |
| Particle Size ($\mu$) | 1–2 | 1–2 | <5 | <1 | 1 |
| CCT (%) | 2–3 | 2–3 | 1–2 | 5 | 3 |
| Amount of Scum | little | little | little | little | little |
| Stable PH Range | >5 | >5 | >5 | >4 | >5 |
| Opalescence | remarkable | remarkable | air | remarkable | remarkable |
| Comprehensive Judgment of Emulsifiability | very good | very good | good | very good | very good |

TABLE 3 – EMULSIFIABILTIY (Conventional)

| Product | Reference 1 | reference 2 | reference 3 | reference 4 |
|---|---|---|---|---|
| Acid Number | 15 | 15 | 18 | 20 |
| Gardner Color | <1 | <1 | <1 | <1 |
| Melt Viscosity at 140°C. (cps.) | 180 | 190 | 185 | 300 |
| Emulsion | reference 1 | reference 2 | reference 3 | reference 4 |
| Particle Size ($\mu$) | >10 | >10 | >10 | 5 – 10 |
| CCT (%) | 0.5 | 0.5 | 0.5 | 0.5 – 1 |
| Amount of Scum | much | much | much | much |
| Stable pH Range | >7 | >7 | >7 | >7 |
| Opalescence | none | none | none | slight |
| Comprehensive Judgment of Emulsifiability | poor | poor | poor | poor |

In the above Tables 2 and 3, the standard test formulation for the evaluation of emulsifiability was as follows:

Emulsifiable oxidized polyolefin        50 g.

| | |
|---|---|
| Polyoxyethyleneglycol monononylphenyl ether (emulsifier) | 7 g. |
| 50% NaOH aqueous solution | 0.4 g. |
| 5 % HCl | a little |
| Water | balance |
| Total | 250 g. |

The emulsifiable polyolefin and emulsifier are charged into a beaker equipped with an agitator and melted at 120° C., and the 50 percent NaOH aqueous solution is added thereto. An amount of water less than the amount finally required is heated to 95° – 100° C. and added gradually to the mixture under stirring to obtain an emulsion. The pH of the resulting emulsion is adjusted to 6.5 to 7.0 in 1 percent solution by weight of the emulsion by adding 5 percent HCl. Water is again added to make 250 g. of emulsion. The emulsifiability is evaluated by the appearance, average size of the particles, presence of coarse particles, critical concentration of transparency (CCT), amount of scum, opalescence, stable pH range, etc. An oxidized low molecular weight polyolefin having the following test results was judged emulsifiably good:

| | |
|---|---|
| Size of particles | <5 μ |
| Coarse particles | none |
| CCT | >1 % |
| Amount of scum | a little |
| Opalescence | positive |

In the above tests, the particle size is measured by a microscope. CCT is the maximum concentration of the emulsion through which the light can be seen by the naked eye. Coarse particles, scum and opalescence are observed by the naked eye. The stable pH range is the pH range in which a 1 percent aqueous solution of the emulsion has been stable for 2 days at room temperature.

Having fully described the invention herein, it would be obvious to one of ordinary skill in the art to make numerous changes and modifications thereto without departing from the spirit or scope of the invention. Accordingly,

What is claimed and intended to be covered by letters patent is:

1. In a process for producing an emulsifiable polyolefin having an acid number of 10 to 50 by oxidizing a low molecular weight polyolefin selected from the group consisting of polyethylene, polypropylene and ethylene-α-olefin copolymer, containing less than 30 percent α-olefin having an average molecular weight of 500 to 10,000 obtained by thermally degrading a polyolefin with a gas containing both oxygen and 0.3 to 1.0 percent by volume ozone, at a temperature of up to 150° C., the improvement which comprises carrying out the oxidation in the presence of an oxidized polyolefin selected from the group consisting of oxidized polyethylene, oxidized polypropylene or an oxidized ethylene-α-olefin copolymer having a low molecular weight in such an amount that the acid number of the mixture is 2 – 50, whereby said oxidized polyolefin increases the velocity of the oxidation reaction of said polyolefin and improves the emulsifiability and thermal stability of the product.

2. A process according to claim 1 in which the low molecular weight polyolefin has an average molecular weigh of 500 to 10,000, and is obtained by thermally degrading a high molecular weight polyolefin having an average molecular weight of 10,000 to 500,000.

3. A process according to claim 2 in which the high molecular weight polyolefin is a polyethylene or an ethylene copolymer which has been prepared by a high pressure polymerization process.

4. A process according to claim 1 in which the oxidized polyolefin has an average molecular weight of 500 to 10,000 and an acid number of 3 to 100.

5. A process according to claim 1 in which the oxidized polyolefin is the same oxidized polyolefin or oxidized intermediate obtained in the process of claim 1.

6. A process according to claim 1 in which the oxidation is carried out at 100° to 150° C.

7. A process according to claim 1 in which the oxidation is carried out by introducing the gas containing oxygen and ozone into the melted starting mixture.

8. A process according to claim 1 in which the oxidation reaction is carried out continuously.

9. An emulsifiable oxidized polyethylene which has been obtained by oxidizing a thermally degraded polyethylene having a molecular weight of from 500 to 10,000, an acid number of from 10 to 50, and resisting thermal degradation upon heating to 150° C. obtained by the process of claim 1.

10. The product of claim 9 having a molecular weight of from 1,000 to 5,000.

11. The product of claim 9 in the form of a stable aqueous emulsion.

12. In a process for producing an emulsifiable polyethylene having an acid number of 10 to 50 by oxidizing a low molecular weight polyethylene having a molecular weight of 500 to 10,000, obtained by thermally degrading a polyethylene with a gas containing both oxygen and ozone in a combination of 0.3 to 1.0 percent by volume ozone, at a temperature of up to 150° C., the improvement with comprises, carrying out the oxidation in the presence of an oxidized polyethylene having a low molecular weight in such an amount that the acid number of the mixture is 2 – 50, whereby said oxidized polyethylene increases the velocity of the oxidation reaction of said polyethylene and improves the emulsifiability and thermal stability of the product.

* * * * *